United States Patent
Noda et al.

(10) Patent No.: US 7,738,749 B2
(45) Date of Patent: Jun. 15, 2010

(54) PHOTONIC CRYSTAL HAVING HETEROSTRUCTURE AND OPTICAL DEVICE USING THE PHOTONIC CRYSTAL

(75) Inventors: Susumu Noda, Kyoto (JP); Takashi Asano, Kyoto (JP); Seiichi Takayama, Chuo-ku (JP)

(73) Assignees: Kyoto University, Kyoto (JP); TDK Corporation, Tokyo (JP)

( * ) Notice: Subject to any disclaimer, the term of this patent is extended or adjusted under 35 U.S.C. 154(b) by 1014 days.

(21) Appl. No.: 10/584,942

(22) PCT Filed: Mar. 24, 2005

(86) PCT No.: PCT/JP2005/005355

§ 371 (c)(1),
(2), (4) Date: Jul. 5, 2006

(87) PCT Pub. No.: WO2005/093481

PCT Pub. Date: Jun. 10, 2005

(65) Prior Publication Data

US 2009/0175572 A1     Jul. 9, 2009

(30) Foreign Application Priority Data

Mar. 25, 2004   (JP)   ............................. 2004-090407

(51) Int. Cl.
G02B 6/28   (2006.01)
G02B 6/26   (2006.01)
G02B 6/42   (2006.01)
G02B 6/032  (2006.01)

(52) U.S. Cl. ............................. 385/24; 385/18; 385/125
(58) Field of Classification Search ............. 385/16–18, 385/20–24, 125
See application file for complete search history.

(56) References Cited

U.S. PATENT DOCUMENTS 5,253,319 A   10/1993   Bhagavatula (Continued)

FOREIGN PATENT DOCUMENTS

JP        A 6-88915      3/1994

(Continued)

OTHER PUBLICATIONS

Takashi Asano et al., "Optical Add/Drop Filter Using 2D Photonic Crystal Slab -Interference between single defects-," 29p-L-7, p. 1039, 2002.

(Continued)

*Primary Examiner*—Rhonda S Peace
(74) *Attorney, Agent, or Firm*—Oliff & Berridge, PLC

(57) ABSTRACT

The present invention has been made for providing a photonic crystal capable of multiplexing or demultiplexing light within a wavelength band having a certain width. It includes a slab-shaped body 21 provided with plural forbidden band zones 211 and 212, and holes 221 and 222 having different sizes are arranged in the forbidden band zones with different cycles, respectively. Also formed are a trunk waveguide 24 extending along the direction inclined by +30 degrees from a perpendicular of the boundary 23 between the forbidden band zones 211 and 212, and a branch waveguide 25 extending along the direction inclined by −30 degrees. A ray of light within the multiplexed/demultiplexed wavelength band, which is excluded from the transmission wavelength band of the trunk waveguide 24 in the forbidden band zone 212 and included in the transmission wavelength band of the trunk waveguide 24 in the forbidden band zone 211, is reflected by the boundary 23 and thereby demultiplexed from the trunk waveguide 24 into the branch waveguide 25. Thus, all the rays of light whose wavelengths are within the multiplexed/demultiplexed wavelength band having a certain width are demultiplexed into the branch waveguide 25. Therefore, even if the wavelength of the optical signal is deviated due to some error, the light can be demultiplexed. This is also true for the multiplexing operation.

15 Claims, 7 Drawing Sheets

U.S. PATENT DOCUMENTS

| | | | |
|---|---|---|---|
| 5,612,171 | A | 3/1997 | Bhagavatula |
| 6,130,969 | A | 10/2000 | Villeneuve et al. |
| 6,310,991 | B1 | 10/2001 | Koops et al. |
| 6,512,866 | B1 | 1/2003 | Fan et al. |
| 6,738,551 | B2 | 5/2004 | Noda et al. |
| 6,888,994 | B2 * | 5/2005 | Baumberg et al. ........... 385/129 |
| 7,224,862 | B2 * | 5/2007 | Noda et al. ................... 385/24 |
| 7,428,352 | B2 * | 9/2008 | Noda et al. ................... 385/16 |
| 2002/0009277 | A1 | 1/2002 | Noda et al. |
| 2002/0118923 | A1 | 8/2002 | Wang et al. |
| 2004/0017960 | A1 | 1/2004 | Platzman et al. |
| 2004/0165815 | A1 * | 8/2004 | Kitagawa ..................... 385/16 |
| 2004/0184715 | A1 | 9/2004 | Platzman et al. |
| 2005/0146778 | A1 * | 7/2005 | Noda et al. .................. 359/321 |

OTHER PUBLICATIONS

B.S.Song et al., "Optical Add/Drop Filter Using an In-plane Hetero Photonic Crystal," 25p-YA-17, p. 916, 2002.

Y. Tanaka et al., "Effects of TM-like Slab Mode on Line-Defect Waveguide in 2D Photonic Crystal Slab," 28a-YN-9, p. 1129, 2003.

Alongkam Chutinan et al. "Waveguides and waveguide bends in two-dimensional photonic crystal slabs," Physical Review B, 2003. vol. 62, No. 7, pp. 4488-4492, 2000.

* cited by examiner

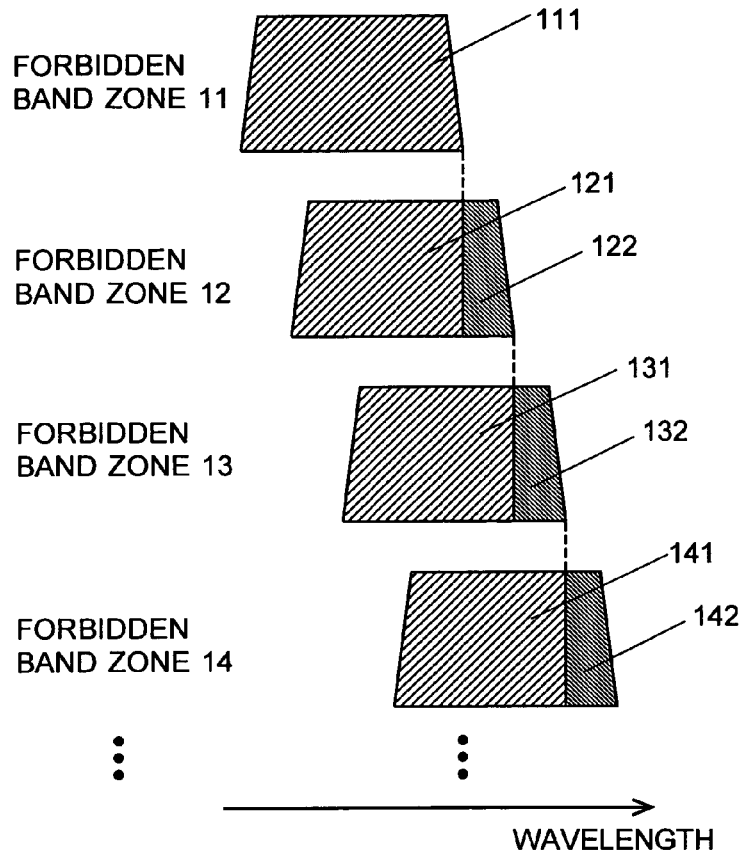
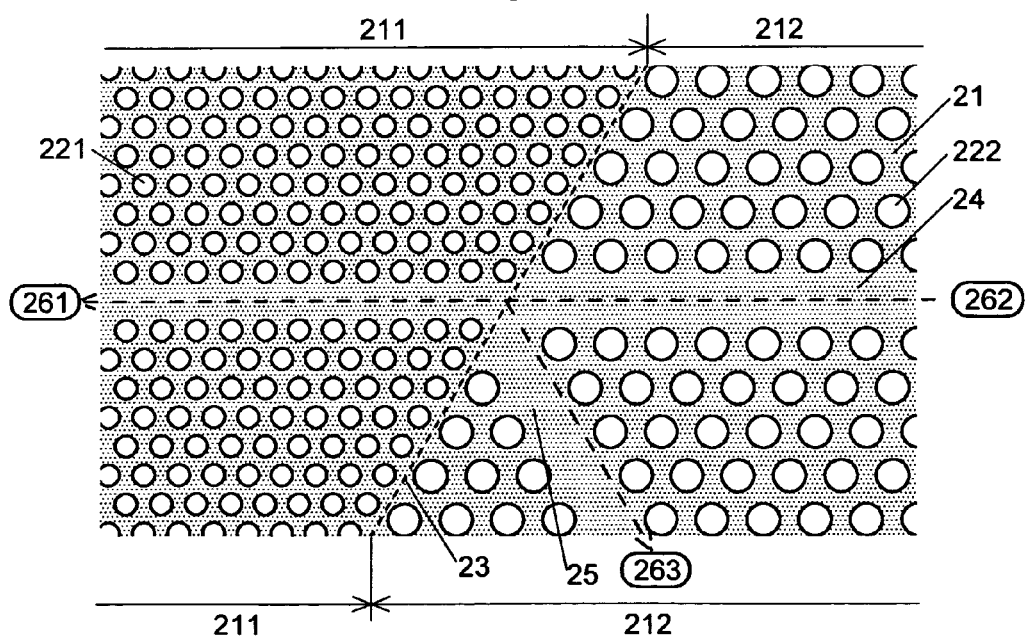

FORBIDDEN BAND ZONE 211

FORBIDDEN BAND ZONE 212

PHOTONIC CRYSTAL HAVING HETEROSTRUCTURE AND OPTICAL DEVICE USING THE PHOTONIC CRYSTAL

TECHNICAL FIELD

The present invention relates to a photonic crystal applicable to optical multiplexer/demultiplexers or optical transmitter/receivers used in wavelength division multiplexing communications or other technical fields. In the present patent application, the term "light" includes not only visible light but also electromagnetic waves in general.

BACKGROUND ART

In recent years, optical communication lines are spreading to general households as well as being used as backbone lines connecting cities. Making optical communications available in general households requires optical transmitter/receiver modules in every household for the conversion between optical and electrical signals. An optical transmitter/receiver module generally consists of three components: an optical transmitter, optical receiver, and wavelength multiplexer/demultiplexer. Typically, a laser diode (LD) is used as the optical transmitter and a photodiode (PD) is used as the optical receiver. For the wavelength multiplexer/demultiplexer, a flat glass coated with dielectric multilayer films or a cubic prism type has been used so far. However, these devices are relatively large, and a smaller type of wavelength multiplexer/demultiplexer is in demand for use in general households.

Recently, photonic crystals have been drawing attention as new optical devices. A photonic crystal consists of a dielectric body having an artificial cyclic structure. In general, the cyclic structure is created by providing the dielectric body with a cyclical arrangement of areas (called the modified refractive index areas) whose refractive index differs from that of the body. This cyclic structure forms a band structure within the crystal with respect to the energy of light and thereby creates an energy region (called the photonic bandgap or PBG) that disallows the propagation of light. The energy region (or wavelength band) in which the PBG is created depends on the refractive index of the dielectric body and the cycle (cycle distance) of the cyclic structure.

Introduction of an appropriate defect into the photonic crystal creates a specific energy level (called the defect level) within the photonic bandgap, which allows only a ray of light having a wavelength corresponding to the defect level to exist in proximity to the defect. Provision of a point-like defect in a photonic crystal enables the crystal to be used as an optical resonator (i.e. a point-like defect) for the aforementioned wavelength, and provision of a defect extending along a line makes the crystal available as a waveguide (i.e. a linear defect). Furthermore, if the resonator is located in proximity to the waveguide, the photonic crystal functions as a wavelength multiplexer/demultiplexer. This wavelength multiplexer/demultiplexer is capable of functioning as the following two devices: an optical demultiplexer for extracting a ray of light whose wavelength equals the resonance wavelength of the resonator from rays of light having different wavelengths and propagating through the waveguide, and for emitting the extracted light to the outside; and an optical multiplexer for introducing the same ray of light from the outside into the waveguide. Wavelength multiplexers/demultiplexers using a photonic crystal can be smaller in size than the conventional ones using a multilayer-coated flat glass or a cubic prism.

Patent Document 1 discloses such a wavelength multiplexer/demultiplexer, which can multiplex or demultiplex a predetermined wavelength of light by appropriately setting the size and/or shape of the point-like defect. Patent Document 2 discloses a two-dimensional photonic crystal wavelength multiplexer/demultiplexer consisting of a two-dimensional photonic crystal having multiple zones (forbidden band zones) with different cycles, in which a waveguide passes through the multiple zones and a resonator is located in each forbidden band zone. In this construction, each resonator multiplexes or demultiplexes light having a different wavelength due to the different cycle of each zone.

[Patent Document 1] Unexamined Japanese Patent Publication No. 2001-272555 (paragraphs 0023-0027; FIG. 1)

[Patent Document 2] Unexamined Japanese Patent Publication No. 2003-279764 (paragraphs 0029-0034, 0057-0059; FIGS. 17, 18)

The point-like defects formed in the two-dimensional photonic crystal causes the resonation of light within a narrow wavelength band. Although the emission band of laser diodes is also very narrow, it is difficult to produce a product that emits light whose central wavelength coincides exactly with the desired wavelength because the central wavelength varies due to productive factors or other reasons. Therefore, to apply a two-dimensional photonic crystal wavelength multiplexer/demultiplexer to an optical transmitter/receiver module, it is necessary to perform a tuning (or selection) of laser diodes so that the wavelength used by the laser diode falls within the narrow wavelength band of the point-like defect resonator. Such a tuning process enables the two-dimensional photonic crystal wavelength multiplexer/demultiplexer having a point-like defect to be used to construct a high-precision optical transmitter/receiver module for long distance support systems.

However, as for household optical transmitter/receiver modules, the tuning process is difficult to perform in view of its costs. Therefore, it is desirable to invent a wavelength multiplexer/demultiplexer capable of multiplexing or demultiplexing light within a wavelength band having a certain width so that it can accommodate various wavelengths of laser diodes to be used.

DISCLOSURE OF THE INVENTION

Problem to Be Solved by the Invention

Thus, the problem to be addressed by the present invention is to provide a photonic crystal suitable for household optical transmitter/receiver modules and other devices and capable of multiplexing or demultiplexing light within a wavelength band having a certain width.

Means for Solving the Problems

To solve the aforementioned problem, the photonic crystal according to the present invention is characterized in that it includes:

a) a first forbidden band zone and a second forbidden band zone, located adjacent to each other;

b) a trunk waveguide obliquely crossing the boundary between the two forbidden band zones, which is designed so that a multiplexed/demultiplexed wavelength band constituting of a segment of the transmission wavelength band in the first forbidden band zone is excluded from the transmission wavelength band in the second forbidden band zone; and c) a branch waveguide extending from the intersection of the trunk waveguide and the aforementioned boundary into the first forbidden band zone and being designed so that its transmission wavelength band includes the aforementioned multiplexed/demultiplexed wavelength band.

The above construction may have two or more forbidden band zones aligned in series along the trunk waveguide, with the multiplexed/demultiplexed wavelength band of each forbidden band zone being included in the transmission wavelength band of the trunk waveguide in all the forbidden band zones located on the upstream side, which is defined as the side where the branch waveguide extends from the intersection of the boundary of the forbidden band zones and the trunk waveguide. In this case, it is desirable that a blocking zone for blocking light within the transmission wavelength band of the trunk waveguide of the forbidden band zone located at the most downstream position is connected to the aforementioned forbidden band zone, the boundary between the aforementioned forbidden band zone and the blocking zone is obliquely formed with respect to the trunk waveguide, and another branch waveguide is formed from the intersection of the boundary and the trunk waveguide into the aforementioned forbidden band zone.

For the convenience of explanation, the present patent application defines the terms "upstream" and "downstream" as indicating the direction of the light that propagates through the trunk waveguide from one (upstream) side to the other (downstream) side when the photonic crystal according to the present invention is used as an optical demultiplexer.

The forbidden band zone may preferably consist of a two-dimensional photonic crystal having a slab-shaped body in which modified refractive index areas, i.e. the areas whose refractive index differs from that of the body, are cyclically arranged. Particularly, it is desirable that the trunk waveguide is formed by creating a linear defect of the modified refractive index areas and that the cycle of the modified refractive index areas is changed from one forbidden band zone to another. Alternatively, it is desirable that the trunk waveguide is formed by creating a linear defect of the modified refractive index areas and the shape or size of the modified refractive index areas is changed from one forbidden band zone to another. The modified refractive index areas may be preferably made of air (i.e. holes).

The branch waveguide may be preferably constructed so that it allows light to propagate within the multiplexed/demultiplexed wavelength band but prevents the propagation of light passing through the trunk waveguide within a predetermined wavelength band excluded from the multiplexed/demultiplexed wavelength band. This construction may have one of the following features or a combination of them:

(1) The width of the branch waveguide is determined so that the branch waveguide allows light to propagate within the multiplexed/demultiplexed wavelength band but prevents the propagation of light passing through the trunk waveguide within a predetermined wavelength band excluded from the multiplexed/demultiplexed wavelength band.

(2) The forbidden band zone consists of a two-dimensional photonic crystal having a slab-shaped body, and a clad member is provided in contact with the branch waveguide.

(3) A bend section is formed in the branch waveguide. In this case, it is preferable that the forbidden band zone consists of a two-dimensional photonic crystal having a slab-shaped body provided with a cyclic arrangement of areas whose refractive index differs from that of the body, and the size and/or shape of the modified refractive index area or areas in proximity to the bend section differs from that of the other modified refractive index areas.

(4) The forbidden band zone consists of a two-dimensional photonic crystal having a slab-shaped body provided with a cyclic arrangement of areas whose refractive index differs from that of the body, and the size and/or shape of modified refractive index area or areas in proximity to the connection point of the trunk waveguide and the branch waveguide differs from that of the other modified refractive index areas.

Any of the photonic crystals described thus far functions as an optical demultiplexer which uses the trunk waveguide as the input waveguide and the branch waveguide as the output waveguide, and also as an optical multiplexer which uses the branch waveguide as the input waveguide and the trunk waveguide as the output waveguide.

Furthermore, it is possible to construct an optical transmitter/receiver including: one of the photonic crystals described thus far; an optical transmitter located in either the branch waveguide or the trunk waveguide in the second forbidden band zone; and an optical receiver provided in the other of the aforementioned two waveguides.

Modes for Carrying Out the Invention and its Effects

According to the present invention, a photonic crystal having at least two forbidden band zones (i.e. the first forbidden band zone and the second forbidden band zone) is used as the base member (the forbidden band zone will be detailed later). The photonic crystal may be either a two-dimensional photonic crystal having a flat structure or a three-dimensional photonic crystal having a three-dimensional structure, of which the two-dimensional one is easier to manufacture. For example, the two-dimensional photonic crystal can be created by cyclically arranging modified refractive index areas in a slab-shaped body. The modified refractive index area can be created by embedding into the body a solid member whose refractive index differs from that of the body. However, more preferably, this area should be a hole because it yields a large difference in the refractive index and is easier to manufacture.

The trunk waveguide is formed so that it passes through the first and second forbidden band zones. A forbidden band zone is defined as a zone where the transmission wavelength band (i.e. the wavelength band in which light can propagate through the waveguide) of the trunk waveguide formed therein is uniform. The trunk waveguide can be formed by creating a linear area in which the cyclic structure of the photonic crystal is disordered.

In this construction, a segment of the transmission wavelength band in the first forbidden band zone is excluded from the transmission wavelength band in the second forbidden band zone. This segment of the wavelength band is called the "multiplexed/demultiplexed wavelength band." The transmission wavelength band of the trunk waveguide changes based on the cyclic structure of the photonic crystal. Therefore, for each forbidden band zone, it is possible to control the transmission wavelength band of the trunk waveguide by using a different cyclic structure in each forbidden band zone. For example, if the two-dimensional photonic crystal has the modified refractive index areas described earlier, the distance between adjacent modified refractive index areas may be designed so that it changes from one forbidden band zone to another. Alternatively, it is possible to control the transmission wavelength band of the trunk waveguide by changing the shape or size of the modified refractive index areas even if all the forbidden band zones have the same cycle.

The trunk waveguide is formed so that it obliquely crosses the boundary of the forbidden band zones (such a boundary is called the "oblique boundary"). The form of the oblique boundary is that its contact line (if a two-dimensional photonic crystal is used) or contact plane (if a three-dimensional photonic crystal is used) at the intersection with the trunk waveguide is oblique with respect to the trunk waveguide, or that it is neither perpendicular nor parallel to the trunk waveguide. At the positions other than the intersection, the oblique boundary can take any form.

Furthermore, a branch waveguide extending from the intersection of the oblique boundary and the trunk waveguide is formed within the first forbidden band zone. The branch waveguide is designed so that its transmission wavelength band includes the multiplexed/demultiplexed wavelength band of the first forbidden band zone. For example, in the case where the two-dimensional photonic crystal has modified refractive index areas cyclically arranged in a triangular lattice pattern, the branch waveguide can be formed along the direction at an angle of 60 degrees from the trunk waveguide of the first forbidden band zone. Then, the multiplexed/demultiplexed wavelength band of the first forbidden band zone will be included in the transmission wavelength band of the branch waveguide. In the present example, even if the angle from the trunk waveguide is different from 60 degrees, the branch waveguide can include the multiplexed/demultiplexed wavelength band of the first forbidden band zone in some cases.

The photonic crystal according to the present invention functions as follows:

A ray of light containing plural wavelength components superimposed on each other, including the light whose wavelength is within the multiplexed/demultiplexed wavelength band, is propagated from the first forbidden band zone through the trunk waveguide. The light having the wavelength within the multiplexed/demultiplexed wavelength band can propagate through the trunk waveguide in the first forbidden band zone but cannot propagate through the trunk waveguide in the second forbidden band zone. Therefore, this light is reflected by the boundary between the two forbidden band zones. A portion of the light thus reflected propagates backwards in opposition to the superimposed light through the trunk waveguide of the first forbidden band zone, while the other portion enters the branch waveguide. The oblique form of the boundary between the first forbidden band zone and the second forbidden band zone with respect to the trunk waveguide suppresses the backward propagation of the reflected light through the trunk waveguide. Thus, the photonic crystal functions as a demultiplexer for separating a ray of light having a wavelength within the multiplexed/demultiplexed wavelength band from the trunk waveguide into a designated branch waveguide. Similarly, it can be used as a multiplexer for introducing a ray of light having a wavelength within the multiplexed/demultiplexed wavelength band from the branch waveguide into the trunk waveguide.

It is possible to provide three or more pieces of forbidden band zones along the trunk waveguide and [(the number of forbidden band zones)—1] sets of oblique boundaries and branch waveguides. In this case, for each forbidden band zone regarded as the above-described first zone, there is an oblique boundary between the first zone and the corresponding second zone, and a branch waveguide is formed from the intersection of the oblique boundary and the trunk waveguide. In addition, in each forbidden band zone, the multiplexed/demultiplexed wavelength band of the trunk waveguide is designed so that it is included in the transmission wavelength band of the trunk waveguide in all the forbidden band zones on the upstream side of the trunk waveguide so as to allow the light having a wavelength within the multiplexed/demultiplexed wavelength band to propagate through the waveguide on the upstream side of the zone concerned and reach the zone.

For example, as shown in FIG. 1, a transmission wavelength band 121 is created in the trunk waveguide in the forbidden band zone 12, and the transmission band zone 111 of the trunk waveguide in the forbidden band zone 11 is shifted from the transmission wavelength band 121 toward the short wavelength side. Furthermore, in the trunk waveguide in the forbidden band zones 13, 14, . . . on the opposite side of the forbidden band zone 12 with respect to the forbidden band zone 11 (i.e. on the opposite side of the oblique boundary), transmission wavelength bands 131, 141, . . . are created so that they shift step by step toward the long wavelength side. In this construction, the multiplexed/demultiplexed wavelength band 122 included in the transmission band zones 121 and excluded from the transmission band zone 111 can pass through the trunk waveguide in the forbidden band zones 12, 13, 14, . . . but cannot pass through the trunk waveguide in the forbidden band zone 11. Therefore, it is reflected by the oblique boundary between the forbidden band zones 11 and 12. Similarly, the multiplexed/demultiplexed wavelength bands 132, 142, . . . are created in the trunk waveguide in the forbidden band zones 13, 14, . . . and rays of light whose wavelengths are each included in each of the aforementioned wavelength bands are reflected by the oblique boundaries between the forbidden band zones 12 and 13, between the forbidden band zones 13 and 14, . . . , respectively. Thus, in each forbidden band zone, a ray of light whose wavelength is within the corresponding, specific multiplexed/demultiplexed wavelength band can be demultiplexed into the branch waveguide.

If there are three or more pieces of forbidden band zones, it is desirable that a blocking zone for blocking the light whose wavelength is within the transmission wavelength band in the trunk waveguide in the forbidden band zone located at the most downstream end of the trunk waveguide is connected to the aforementioned forbidden band zone, the trunk waveguide is obliquely formed with respect to the boundary between the aforementioned forbidden band zone and the blocking zone, and a branch waveguide is formed from the intersection of the boundary and the trunk waveguide into the aforementioned forbidden band zone. Such a blocking zone may consist of a photonic crystal in which the transmission wavelength band of the aforementioned forbidden band zone is included in the photonic bandgap. In this construction, the superimposed light or the light within the aforementioned specific wavelength band is received or emitted through the branch waveguide. The provision of this branch waveguide enables the input/output operation of light to be performed in the forbidden band zone adjacent to the blocking zone, as in the other forbidden band zones. For example, this branch waveguide can be formed parallel to the other branch waveguides so that all the input/output sections can be arranged on the same side of the photonic crystal.

The conventional wavelength multiplexer/demultiplexer consisting of a photonic crystal in which a waveguide and a point-like defect resonator are formed can multiplex or demultiplex light only within a narrow wavelength band including the resonance wavelength of the resonator. In contrast, the wavelength multiplexer/demultiplexer using a photonic crystal according to the present invention can multiplex or demultiplex all the wavelengths of light within the multiplexed/demultiplexed wavelength band. Therefore, the wavelength band of the multiplexed or demultiplexed light is broader than in the case where the point-like defect resonator is used. Even if the wavelength of light emitted from the laser diode is deviated from the design value, the photonic crystal multiplexer/demultiplexer according to the present invention can multiplex or demultiplex the light as long as the deviation is within the multiplexed/demultiplexed wavelength band. With the deviation of wavelength thus allowed, optical communication devices can be produced at lower costs.

Next, the light propagating through the branch waveguide is examined. When the light is demultiplexed, rays of light whose wavelengths are within the multiplexed/demultiplexed wavelength band are entirely reflected by the boundary with the second forbidden band zone, and a portion of the light that can propagate through the second zone is also reflected by the same boundary. This means that a ray of light whose wavelength is excluded from the desired wavelength band may enter the branch waveguide. To prevent or impede the propagation of light having such a wavelength, the branch waveguide should be preferably constructed so that it allows the propagation of light belonging to a predetermined wavelength band within the multiplexed/demultiplexed wavelength band but prevents the propagation of light passing through the trunk waveguide within a predetermined wavelength band excluded from the multiplexed/demultiplexed wavelength band.

The branch waveguide can be formed, for example, (1) by appropriately determining its width, taking into account the phenomenon that the transmission wavelength band shifts or becomes broader or narrower as the width of the waveguide changes. (2) Another possible method is to utilize the phenomenon that light within a segment of a wavelength band leaks to the outside of the crystal when a member whose refractive index is higher than that of the air (i.e. a clad member) is in contact with the branch waveguide in the two-dimensional photonic crystal. In this case, the clad member may be located either on the upper or lower side of the slab. Information about the provision of the clad member is disclosed in Yoshinori TANAKA, et al., "Nijigen Photonic Kesshou Douharo Ni Ataeru TM-like Slab Mode No Eikyou (Effects of TM-like Slab Mode on Line-Defect Waveguide in 2D Photonic Crystal Slab)", *Preprints of the Fiftieth Joint Symposia Applied Physics,* Vol. 3 (2003), p. 1129, Japan Society of Applied Physics. It is possible to prevent the propagation of light through the branch waveguide within the predetermined wavelength band excluded from the multiplexed/demultiplexed wavelength band, by providing a clad member so that light within the predetermined wavelength band excluded from the multiplexed/demultiplexed wavelength band leaks to the outside of the crystal. (3) Alternatively, in a two-dimensional photonic crystal consisting of a slab-shaped body in which modified refractive index areas are cyclically arranged, the transmission wavelength band of the branch waveguide can be controlled by making the size or shape or both of the modified refractive index areas in proximity to the connection point of the trunk waveguide and the branch waveguide (or the modified refractive index areas in proximity to the bend section, if such a section is formed) differ from those of the other modified refractive index areas. (4) It is also possible to form a branch waveguide having a section bent with a predetermined angle. In this case, the wavelength band passing through the band section can be narrower. This is described in A. Chutinun et al., *Physical Review B,* Vol. 62 (2000), pp. 4488-4491, American Institute of Physics. In the case of (4), if a two-dimensional photonic crystal consisting of a slab-shaped body in which modified refractive index areas are cyclically arranged, the transmission wavelength band of the branch waveguide can be better controlled by making the size or shape or both of the modified refractive index areas in proximity to the bend section differ from those of the other modified refractive index areas.

These methods make it possible to prevent light within a predetermined wavelength band excluded from the multiplexed/demultiplexed wavelength band propagating through the branch waveguide by controlling the transmission wavelength band of the branch waveguide so that it does not include the predetermined wavelength band or by making the light within the predetermined wavelength band leak to the outside of the crystal.

An optical transmitter/receiver can be constructed using a photonic crystal according to the present invention by providing an optical transmitter in either the trunk waveguide in the second forbidden band zone or the branch waveguide, and by providing an optical receiver in the other of the two waveguides. As in the case of conventional optical transmitter/receivers, a laser diode can be used as the optical transmitter and a photodiode can be used as the optical receiver. If the optical transmitter is located at the aforementioned position in the trunk waveguide and the optical receiver is located in the branch waveguide, a ray of light whose wavelength is within the multiplexed/demultiplexed wavelength band is used as the reception signal, and a ray of light whose wavelength is within the transmission wavelength band of the trunk waveguide at the aforementioned position is used as the transmission signal. In this case, the reception signal is reflected by the oblique boundary and then passes through the branch waveguide to be detected by the optical receiver, whereas the transmission signal travels from the optical transmitter to the outside without being reflected by the oblique boundary. Conversely, if the optical receiver is provided in the trunk waveguide and the optical transmitter is provided in the branch waveguide, the wavelength bands of the transmission and reception signals should be oppositely chosen.

BRIEF DESCRIPTION OF THE DRAWINGS

FIG. 1 is a diagram showing an example of the transmission wavelength band created in the waveguide in each of the forbidden band zones according to the present invention.

FIG. 2 is a plan view of the first embodiment of the two-dimensional photonic crystal according to the present invention.

Figure 3:
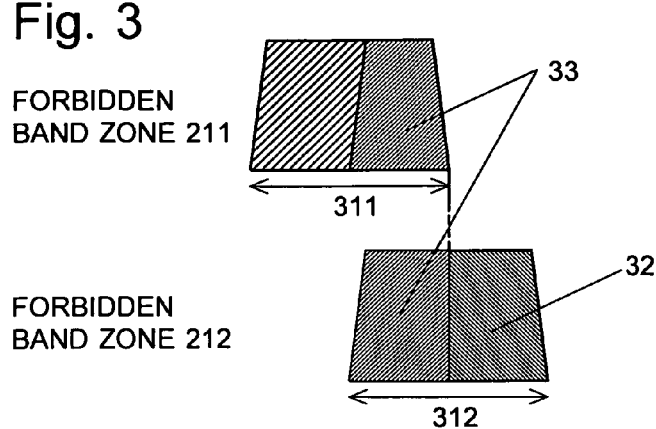
FIG. 3 is a diagram showing the waveguide transmission wavelength band of the two-dimensional photonic crystal of the present embodiment.

EXPLANATION OF NUMERALS 11, 12, 13, 14, 211, 212, 411, 412, 413 . . . Forbidden Band Zone
111, 121, 131, 141, 311, 312 . . . Transmission Wavelength Band
122, 132, 142, 32 . . . Multiplexed/Demultiplexed Wavelength Band
21 . . . Body
221, 222, 421, 422, 423 . . . Hole
23, 432, 433 . . . Boundary
24, 44 . . . Trunk Waveguide
25, 452, 453 . . . Branch Waveguide
46 . . . Blocking Zone
51 . . . Laser Diode
52 . . . Photodiode
53 . . . Optical Fiber
611, 612 . . . Guided Mode
62 . . . Light Line of Air
63 . . . Light Line of $SiO_2$

EMBODIMENTS

The first embodiment of the photonic crystal having a heterostructure according to the present invention is described with reference to the plan view shown in FIG. 2. The body 21, which is shaped like a slab, is made of Si, GaAs or other material. The body 21 is divided into two forbidden band zones 211 and 212. In these forbidden band zones 211 and 212, cylindrical holes 221 and 222 (depicted as circles in FIG. 2) having diameters of $r_1$ and $r_2$ ($r_1 < r_2$) are cyclically arranged in triangular lattice patterns, respectively. The cycle of each triangular lattice pattern is a, in the forbidden band zone 211 and $a_2$ in the forbidden band zone, where $a_1 < a_2$. In each forbidden band zone, the cyclic arrangement of the holes creates a PBG having a wavelength band corresponding to the cycle. In the present embodiment, the ratio of the diameters of the holes $r_1:r_2$ is equal to that of the cycles of the triangular lattices $a_1:a_2$.

The boundary 23 between the forbidden band zones 211 and 212 is formed parallel to one of the three sides of the triangular lattice pattern. There is no need to employ another member to create the boundary 23; it is necessary to change only the cycle and/or size of the holes between the two sides of the boundary 23.

The holes 221 and 222 are linearly omitted along one of the three sides of the triangular lattice different from the direction of the boundary 23 to create a trunk waveguide 24 passing through the two forbidden band zones 211 and 212. The trunk waveguide 24 thus formed is inclined by 60 degrees from the boundary 23.

From the intersection of the boundary 23 and the trunk waveguide 24, the holes 222 are linearly omitted along one of the three sides of the triangular lattice different from the directions of the boundary 23 and the trunk waveguide 24 to create a branch waveguide 25 within the forbidden band zone 212. Accordingly, the branch waveguide 25 intersects with the trunk waveguide at an angle of 60 degrees.

The operation of the two-dimensional photonic crystal of the present embodiment used as a wavelength multiplexer/demultiplexer is described below. When used as a multiplexer, the wavelength multiplexer/demultiplexer introduces superimposed waves of various wavelengths from one end of the forbidden band zone 212 into the trunk waveguide 24 towards the boundary 23 (as denoted by numeral 262 in FIG. 2) and demultiplexes the light into two rays having different wavelength bands, sending one ray toward the other end of the trunk waveguide 24 in the forbidden band zone 211 (as denoted by numeral 261) and the other ray into the branch waveguide 25 (as denoted by numeral 263).

The transmission wavelength bands of the trunk waveguide 24 and the branch waveguide 25 are hereby examined. As in the present embodiment, if $r_1:r_2$ equals $a_1:a_2$ and they are smaller than 1, the transmission wavelength band 311 of the trunk waveguide 24 in the forbidden band zone 211 is shifted from the transmission band 312 in the forbidden band zone 212 toward the short wavelength side, as shown in FIG. 3 Therefore, a multiplexed/demultiplexed wavelength band 32, which is excluded from the transmission wavelength band 311, is created on the long wavelength side of the transmission wavelength band 312. The branch waveguide 25, whose cyclic structure is disordered in the same manner as that of the trunk waveguide 24 in the forbidden band zone 212, has the same transmission wavelength band as that of the trunk waveguide 24 in the forbidden band zone 212.

Among the superimposed waves propagating through the trunk waveguide 24, any ray of light (called "Light 2" hereinafter) whose wavelength is within the multiplexed/demultiplexed wavelength band 32 is excluded from the transmission wavelength band 311, so that it cannot propagate through the trunk waveguide 24 in the forbidden band zone 211. Therefore, Light 2 is reflected by the boundary 23. Most of Light 2 thus reflected enters the branch waveguide 25, while a portion of it returns into the trunk waveguide 24 on the input side (i.e. in the forbidden band zone 212).

In contrast, among the superimposed rays of light propagating through the trunk waveguide 24, any ray of light (called "Light 1" hereinafter) whose wavelength is within the wavelength band 33 included. in both transmission band zones 311 and 312 passes through the boundary 23 and is extracted from the end of the trunk waveguide 24 in the forbidden band zone 211.

Figure 4:
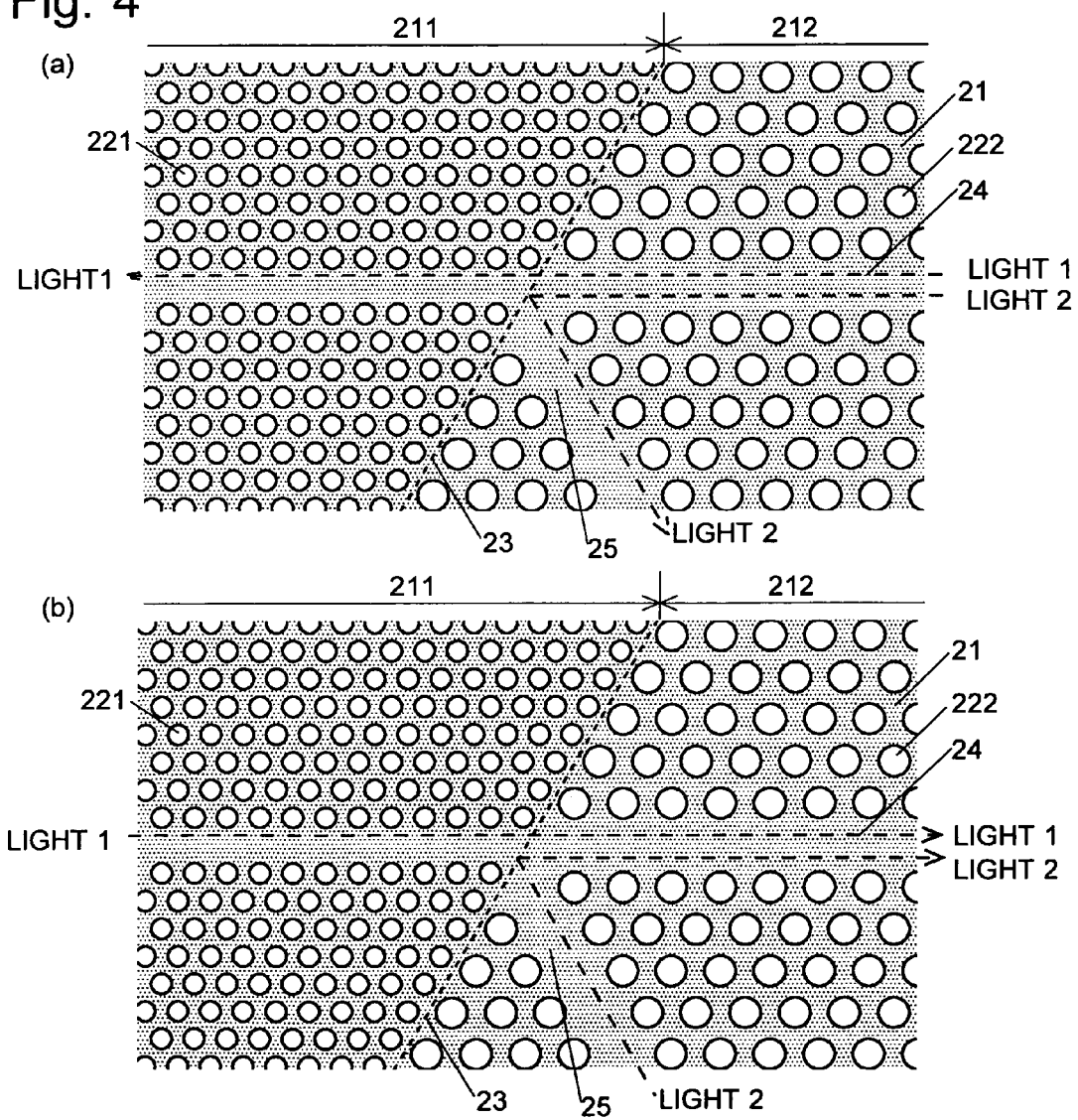
FIG. 4 is a plan views each showing the two-dimensional photonic crystal of the present embodiment functioning as a demultiplexer ((a)) or a multiplexer ((b)).

As explained thus far, Light 1 is demultiplexed into the trunk waveguide 24 in the forbidden band zone 211 while Light 2 is demultiplexed into the branch waveguide 25 (FIG. 4(a)). Conversely, if Light 1 is introduced into the trunk waveguide 24 from the side of the forbidden band zone 211 and Light 2 is introduced from the branch waveguide 25, the two rays of light are multiplexed together and extracted from the end of the trunk waveguide 24 in forbidden band zone 212.

Figure 5:
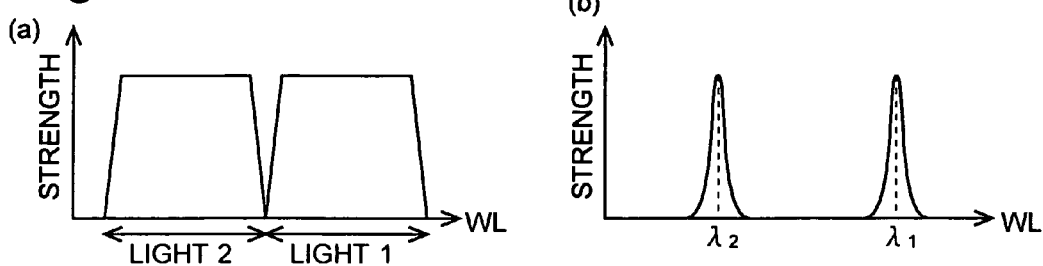
FIG. 5 shows two graphs each indicating the wavelength band of light multiplexed or demultiplexed in the two-dimensional photonic crystal of the present embodiment ((a)) or a conventional one ((b)).

In the present embodiment, light is multiplexed or demultiplexed within a wavelength band having a certain width, as shown in FIG. 5(a). In contrast, the wavelength multiplexer/demultiplexer disclosed in Patent Document 1 or 2, which uses a resonator created by forming a point-like defect of holes, multiplexes or demultiplexes light only within a narrow wavelength range represented by the Lorenz distribution in proximity to each of the resonance wavelengths $\lambda_1, \lambda_2, \ldots$ at the resonators, as shown in FIG. 5(b). Therefore, in the case where such a resonator is used, if the wavelength of the light to be multiplexed or demultiplexed is deviated from the resonance wavelength, the light cannot be multiplexed or demultiplexed or the strength of the multiplexed/demultiplexed light decreases. In contrast, in the present embodiment, light can be multiplexed or demultiplexed even if its wavelength is deviated to a certain extent.

Due to the presence of the boundary 23, a portion of Light 1 present in the trunk waveguide 24 enters the branch waveguide 25 as well as Light 2. To suppress this phenomenon, it is preferable to choose one of the constructions shown in FIGS. 6, 8 and 9.

Figure 6:
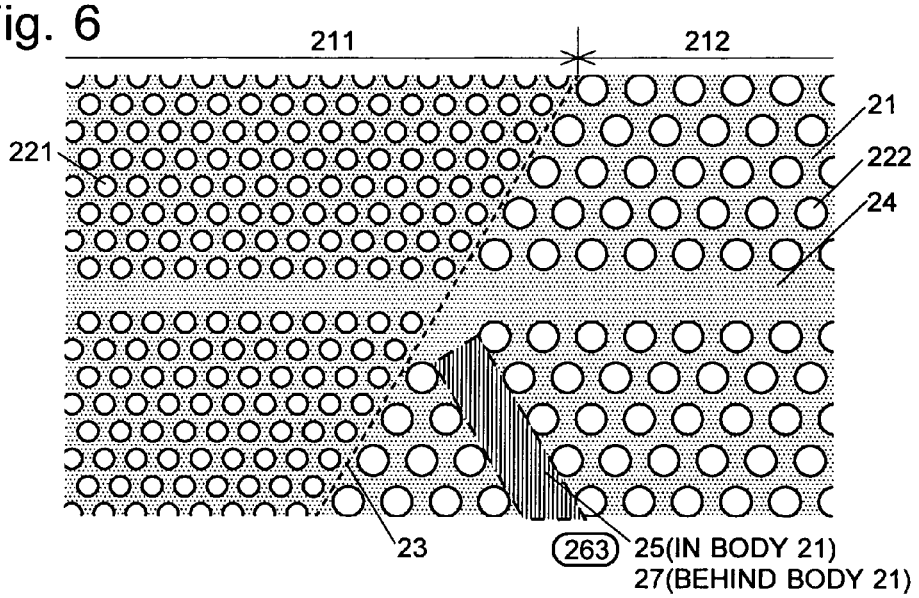
FIG. 6 is a plan view of the two-dimensional photonic crystal of the present embodiment with a clad member located under the branch waveguide.

FIG. 6 shows a clad member 27 made of a material whose refractive index is higher than that of the air, located under the branch waveguide 25. For example, if the body 21 is made of Si, a preferable material for the clad member 27 is $SiO_2$ because this choice enables a commercial SOI (silicon on insulator) substrate to be used to integrally create both the body and the clad member. In the present embodiment, the clad member 27 is located under the branch waveguide 25, which may be alternatively located over the branch waveguide 25.

Figure 7:
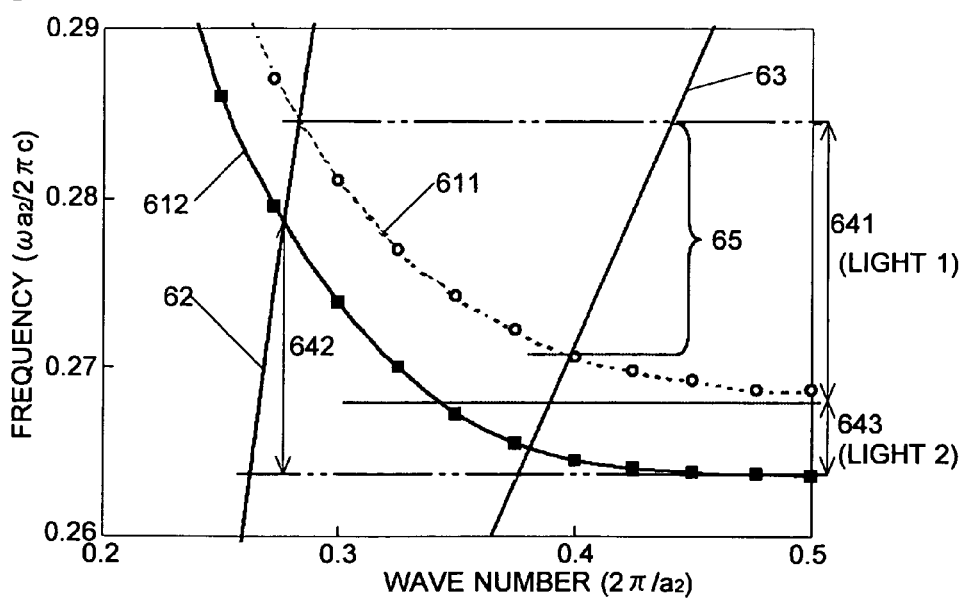
FIG. 7 is a graph showing a shift of the light line depending on whether the clad member is present.

The effect of the presence of the clad member 27 is hereby explained with reference to FIG. 7. In the trunk waveguide in the forbidden band zone 211, light of the guided mode 611 is propagated within the frequency range 641 located on the low frequency (or long wavelength) side of the light line 62. Meanwhile, in the trunk waveguide and the branch waveguide 25 in the forbidden band zone 212, light of the guided mode 612 is propagated within the frequency range 642 located on the low frequency side of the light line 62. A light line indicates the upper limit of the frequency (or the lower limit of the wavelength) beyond which the light leaks from the body and cannot propagate through the waveguide. Given the angular frequency ω, the wave number k, the speed of light c, and the refractive index n of the member that is in contact with the slab surface, the light line is represented by a straight line that satisfies the following relationship:

$$\omega=(c/n)\times k \quad (1)$$

The light line 62 assumes that the parameter n in equation (1) is equal to the refractive index of the air, i.e. 1. The frequency range of Light 1 corresponds to the frequency range 641, and the frequency range of Light 2 corresponds to the range included in the frequency range 642 and excluded from the frequency range 641. A portion of the light within the frequency range 641 enters the branch waveguide 25. The provision of the clad member 27 made of $SiO_2$, whose refractive index is 1.45, on the branch waveguide 25 causes the light line of the branch waveguide 25 to shift from the light line 62, which is applicable to the construction without the clad member 27, towards the low frequency (or long wavelength) side, as indicated by numeral 63 in FIG. 7. With the value of n in equation (1) being increased to 1.45, a portion of Light 1 that has partially entered the branch waveguide 25 within the range 65 located on the high frequency side of the light line 63 leaks from the body surface. Thus, Light 1 is prevented from being mixed with the light that is to be extracted from an end (denoted by numeral 263) of the branch waveguide 25. It should be noted that FIG. 7 shows the result of a calculation carried out under the following conditions: $a_1=0.40$ μm, $a_2=0.41$ μm, $r_1=0.29a_1=116$ nm, $r_2=0.29a_2=119$ nm, the distance of the boundary section between the two forbidden band zones is 0.405 μm, ($=(a_1+a_2)/2$), the width of the trunk waveguide 24 in the forbidden band zone 211 is 0.69 μm, and the width of the trunk waveguide 24 and the branch waveguide 25 in the forbidden band zone 212 is 0.71 μm.

Figure 8:
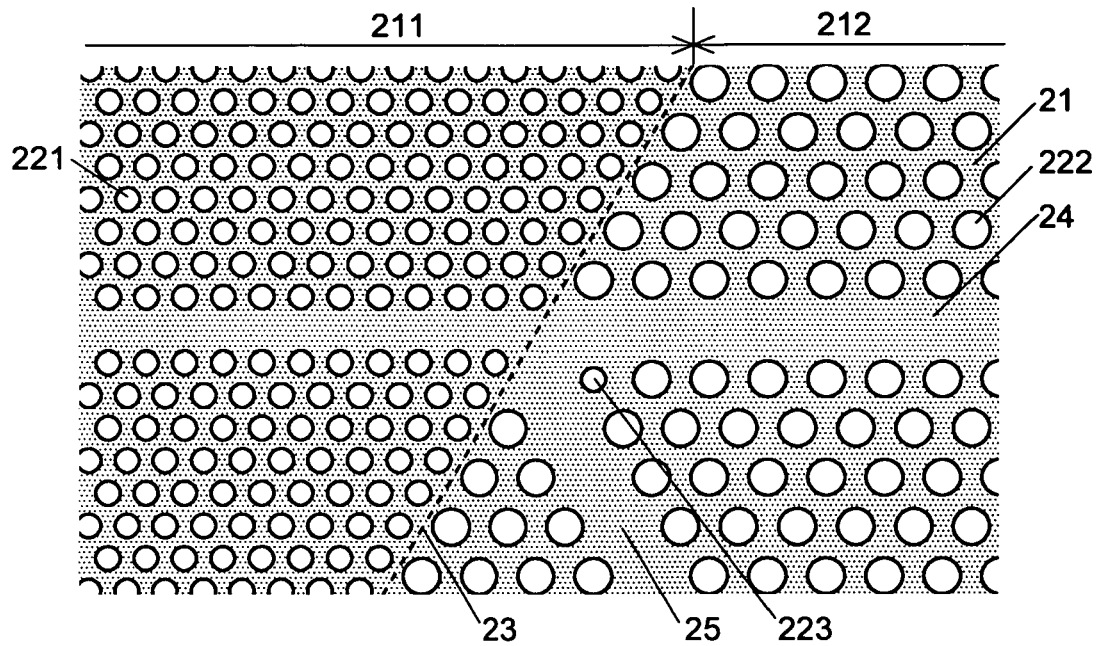
FIG. 8 is a plan view showing an example of the two-dimensional photonic crystal of the present embodiment, in which the diameter of the hole in proximity to the connection point of the trunk waveguide and the branch waveguide is regulated.

FIG. 8 shows an example in which a hole 223 whose diameter differs from that of the other holes is located in proximity to the connection point of the trunk waveguide and the branch waveguide. The reduction in the diameter of the hole 223 leads to a decrease in the transmittance of light at high frequencies within the transmission wavelength band of the branch waveguide 25. This prevents Light 1, whose frequency is higher than that of Light 2, from entering the branch waveguide 25.

Figure 9:
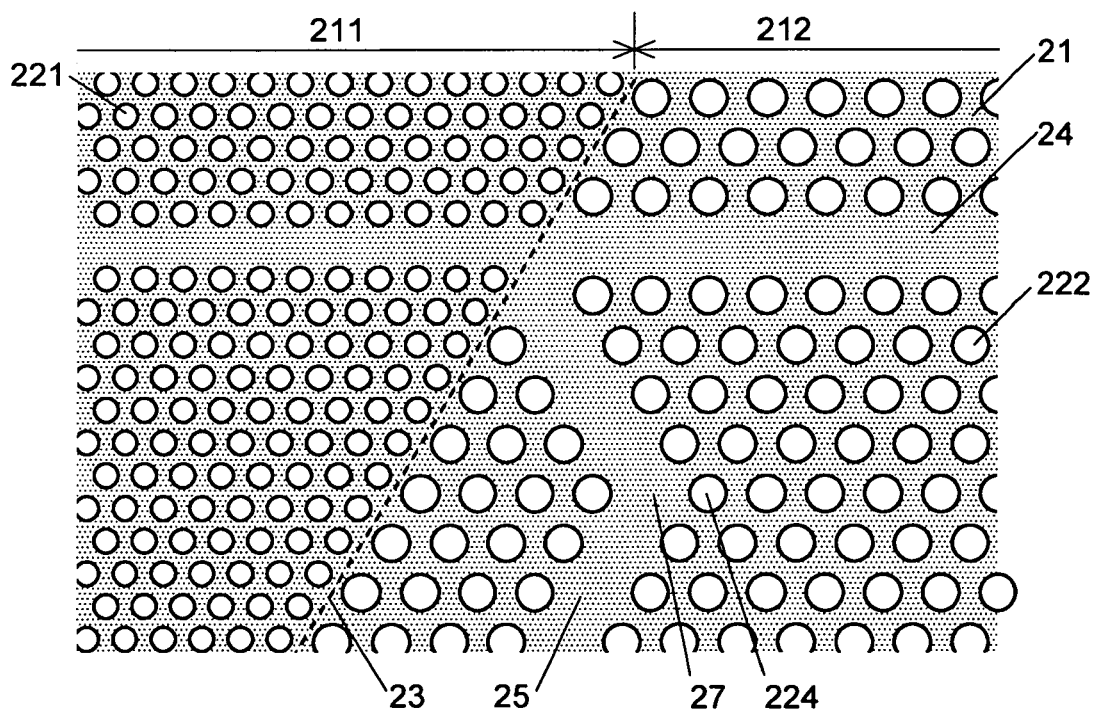
FIG. 9 is a plan view of an example of the two-dimensional photonic crystal of the present embodiment, in which the branch waveguide has a bend section.

FIG. 9 shows an example in which the branch waveguide 25 has a bend section 27. In this construction, the branch waveguide 25 is bent at the bend section 27 to the direction inclined by 60 degrees. In this case, the transmittance of light at high frequencies within the transmission wavelength band of the branch waveguide 25 is lower than in the case where there is no bend section (see A. Chutinun et al., *Physical Review B*, Vol. 62 (2000), p. 4490). This prevents Light 1, whose frequency is higher than that of Light 2, from entering the branch waveguide 25. Reducing the diameter of the hole 224, which is in contact with the bend section 27, more effectively prevents Light 1 from entering the branch waveguide 25.

Figure 10:
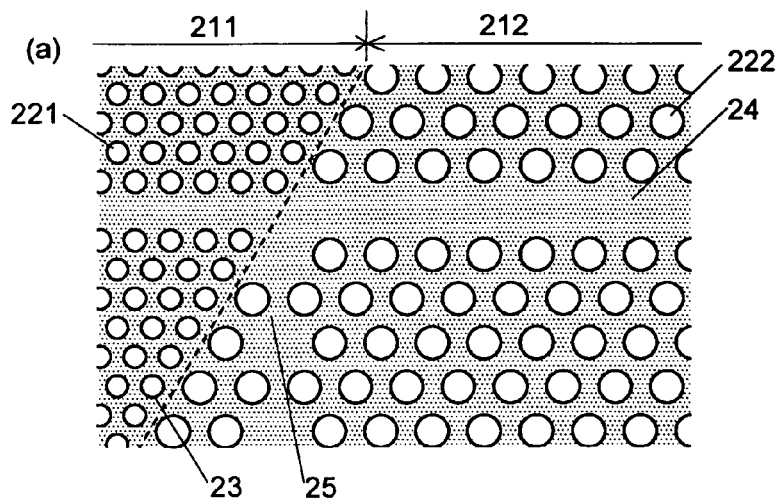
FIG. 10 is a plan view showing modified examples of the first embodiment.
Figure 11:
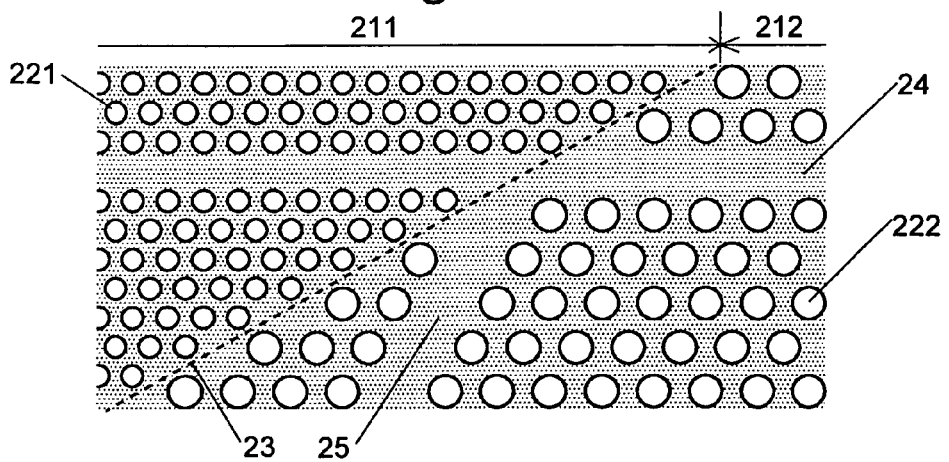
FIG. 11 is a plan view showing a modified example of the first embodiment.
Figure 12:
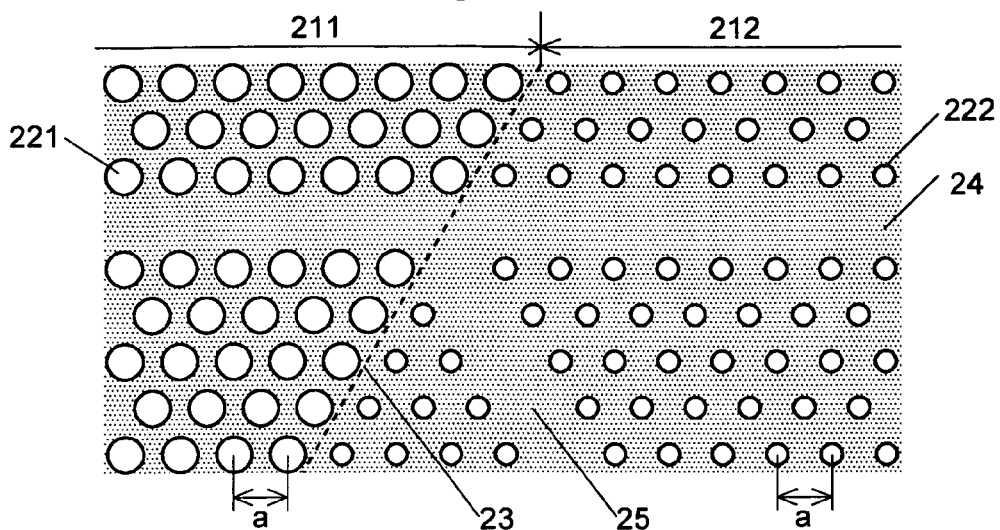
FIG. 12 is a plan view showing a modified example of the first embodiment.

The angles of the boundary and the branch waveguide from the trunk waveguide may be different from those shown in FIG. 2. For example, as shown in FIG. 10, the branch waveguide 25 may be formed so that it intersects with the trunk waveguide 24 at an angle of 90 degrees ((a)) or 30 degrees ((b)). It is also possible to form the boundary 23 so that it intersects with the trunk waveguide 24 at an angle of 30 degrees, as shown in FIG. 11. Furthermore, the ratios $r_1:r_2$ and $a_1:a_2$, which are made equal to each other in the above-described embodiment to facilitate the designing work, may differ from each other. For example, as shown in FIG. 12, it is possible to set $a_1=a_2=a$ while using a different value for the diameter $r_1$ or $r_2$ of the holes in each forbidden band zone.

Figure 13:
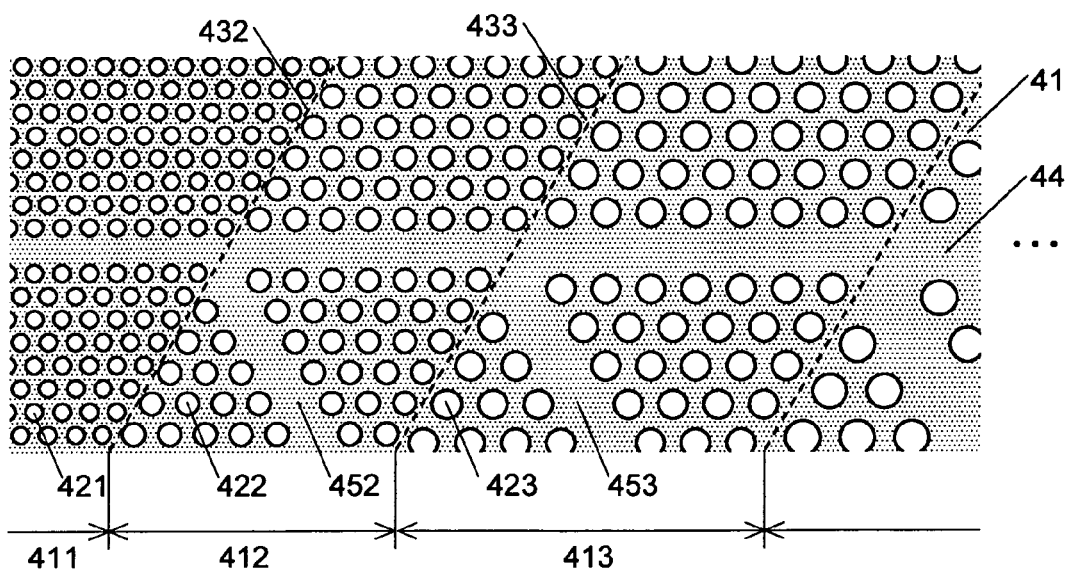
FIG. 13 is a plan view showing the second embodiment of the two-dimensional photonic crystal according to the present invention.

FIG. 13 shows the second embodiment of the photonic crystal having a heterostructure according to the present invention. The present photonic crystal has three or more forbidden band zones (411, 412, 413, . . . ) arranged in series on the body 41, and the boundary 432, 433, . . . are formed between the adjacent forbidden band zones. In each forbidden band zone, holes 421, 422, 423, . . . , each having a diameter of $r_1, r_2, r_3, \ldots$, are arranged with a cycle of $a_1, a_2, a_3, \ldots$, respectively. These values have the following relationships: $a_1<a_2<a_3, \ldots$; $r_1<r_2<r_3, \ldots$; and $a_1:a_2:a_3, \ldots = r_1:r_2:r_3, \ldots$. Also formed is the trunk waveguide 44 passing through all the forbidden band zones and obliquely crossing all the boundaries 432, 433, . . . , as well as the branch waveguides 452, 453, . . . extending from the intersections of the trunk waveguide 44 and the boundaries 432, 433, . . . .

Suppose the photonic crystal of the second embodiment is used as a wavelength multiplexer/demultiplexer. Then, a ray of light is reflected by one of the boundaries 432, 433, . . . and introduced into the corresponding branch waveguides 452, 453, . . . if the light is within the wavelength band that is included in the transmission wavelength band of the trunk waveguide 44 in the forbidden band zone to which the branch waveguide concerned 452, 453, . . . belongs and all the forbidden band zones in which the cycle and diameter of the holes are larger than in the aforementioned forbidden band zone, and if the same wavelength band is excluded from the transmission wavelength band of the trunk waveguide 44 in the forbidden band zone(s) in which the cycle and diameter of the holes are smaller than in the aforementioned forbidden band zone. A ray of light whose wavelength is included in the transmission wavelength band of all the forbidden band zones is extracted from the end of the trunk waveguide 44 in the forbidden band zone 411. Thus, plural rays of light having different wavelength bands are demultiplexed and sent to the trunk waveguide 44 in the forbidden band zone 411 and to each branch waveguide. Inversely introducing rays of light having the different wavelengths makes the photonic crystal operate as a multiplexer.

Figure 14:
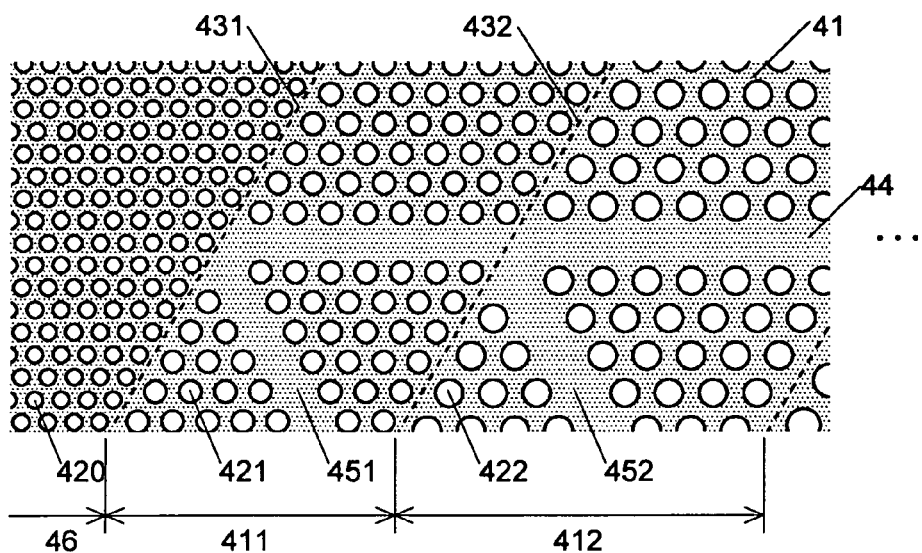
FIG. 14 is a plan view showing a modified example of the second embodiment.

FIG. 14 shows a modified example of the second embodiment. In this construction, a two-dimensional photonic crystal (or blocking zone) 46 in which no trunk waveguide formed is located next to the forbidden band zone 411 shown in FIG. 13. The blocking zone 46 is provided with a cyclic structure that creates a photonic bandgap including the transmission wavelength band of the trunk waveguide 44 in the forbidden band zone 411. The boundary 431 between the forbidden band zone 411 and the blocking zone 46 is obliquely formed with respect to the trunk waveguide 44. A branch waveguide 451 is formed in the forbidden band zone 411, as in the other forbidden band zones. In the construction shown in FIG. 13, the input/output of light in the forbidden band zone 411 takes place through the trunk waveguide 44, whereas, in the construction shown in FIG. 14, the input/output of light in the forbidden band zone 411 takes place through the branch waveguide, as in the other forbidden band zones. Therefore, it is possible to carry out the input/output of all rays of light in the same direction.

Figure 15:
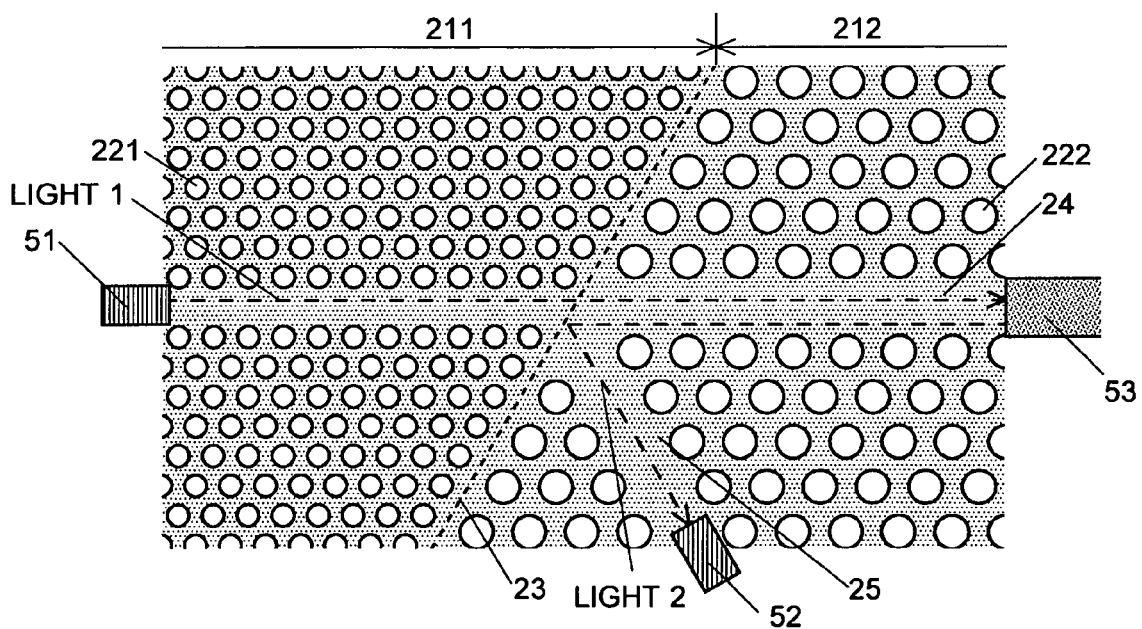
FIG. 15 is a plan view of an embodiment of the optical transmitter/receiver using a two-dimensional photonic crystal according to the present invention.

An optical transmitter/receiver using the photonic crystal of the first embodiment is hereby described with reference to FIG. 15. It includes a laser diode 51 located in the trunk waveguide 24 in the forbidden band zone 211 and a photodiode 52 located in the branch waveguide 25. Furthermore, an optical fiber 53 is connected to the trunk waveguide 24 in the forbidden band zone 212. The laser diode 51 and the photodiode 52 are connected to a communication device installed in general households or other sites, and the optical fiber 53 is connected to an optical communication line. Electrical signals produced by the communication device are converted by the laser diode 51 into optical signals having a predetermined wavelength and sent to the optical communication line. Optical signals received from the optical communication line is converted by the photodiode 52 into electrical signals and sent to the communication device. The present embodiment enables the use of different wavelengths for the transmission signal and the reception signal by using the wavelength band of Light 1 for the laser diode 51 (i.e. for transmitting signals from the communication device to the optical communication line) and the wavelength band of Light 2 for the photodiode 52 (i.e. for receiving signals from the optical communication line to the communication device). In this case, since the wavelength band of Light 1 has a certain width, a small divergence in the transmission wavelength of the laser diode 51 does not influence the transmission or reception of the signals. It is possible to construct another optical transmitter/receiver by transposing the laser diode 51 and the photodiode 52 in the previous example and exchanging the wavelength bands of light used by the laser diode 51 and the photodiode 52.

The invention claimed is:

1. A photonic crystal having a heterostructure, which is characterized in that it comprises:
    a) a first forbidden band zone and a second forbidden band zone, located adjacent to each other;
    b) a trunk waveguide obliquely crossing a boundary between the two forbidden band zones, which is designed so that a multiplexed/demultiplexed wavelength band constituting of a segment of a transmission wavelength band in the first forbidden band zone is excluded from a transmission wavelength band in the second forbidden band zone; and
    c) a branch waveguide extending from an intersection of the trunk waveguide and the aforementioned boundary into the first forbidden band zone and being designed so that its transmission wavelength band includes the aforementioned multiplexed/demultiplexed wavelength band.

2. The photonic crystal having a heterostructure according to claim 1, which is characterized in that it comprises two or more forbidden band zones aligned in series along the trunk waveguide, with the multiplexed/demultiplexed wavelength band of each forbidden band zone being included in the transmission wavelength band of the trunk waveguide in all the forbidden band zones located on an upstream side, which is defined as a side where the branch waveguide extends from the intersection of the boundary of the forbidden band zones and the trunk waveguide.

3. The photonic crystal having a heterostructure according to claim 2, which is characterized in that a blocking zone for blocking light within the transmission wavelength band of the trunk waveguide of the forbidden band zone located at the most downstream position is connected to the aforementioned forbidden band zone, a boundary between the aforementioned forbidden band zone and the blocking zone is obliquely formed with respect to the trunk waveguide, and another branch waveguide is formed from an intersection of the boundary and the trunk waveguide into the aforementioned forbidden band zone.

4. The photonic crystal having a heterostructure according to claim 1, which is characterized in that each forbidden band zone consists of a two-dimensional photonic crystal having a slab-shaped body in which areas whose refractive index differs from that of the body are cyclically arranged.

5. The photonic crystal having a heterostructure according to claim 4, which is characterized in that the trunk waveguide is formed by creating a linear defect of the modified refractive index areas and a cycle of the modified refractive index areas is changed from one forbidden band zone to another.

6. The photonic crystal having a heterostructure according to claim 4, which is characterized in that the trunk waveguide is formed by creating a linear defect of the modified refractive index areas and a shape or size of the modified refractive index areas is changed from one forbidden band zone to another.

7. The photonic crystal having a heterostructure according to claim 4, which is characterized in that the modified refractive index areas is made of air.

8. The photonic crystal having a heterostructure according to claim 1, which is characterized in that the branch waveguide is constructed so that it allows light to propagate within the multiplexed/demultiplexed wavelength band but prevents a propagation of light passing through the trunk waveguide within a predetermined wavelength band excluded from the multiplexed/demultiplexed wavelength band.

9. The photonic crystal having a heterostructure according to claim 8, which is characterized in that a width of the branch waveguide is determined so that the branch waveguide allows light to propagate within the multiplexed/demultiplexed wavelength band but prevents the propagation of light passing through the trunk waveguide within a predetermined wavelength band excluded from the multiplexed/demultiplexed wavelength band.

10. The photonic crystal having a heterostructure according to claim 8, which is characterized in that each forbidden band zone consists of a two-dimensional photonic crystal having a slab-shaped body, and a clad member is provided in contact with the branch waveguide.

11. The photonic crystal having a heterostructure according to claim 8, which is characterized in that a bend section is formed in the branch waveguide.

12. The photonic crystal having a heterostructure according to claim 11, which is characterized in that each forbidden band zone consists of a two-dimensional photonic crystal having a slab-shaped body provided with a cyclic arrangement of areas whose refractive index differs from that of the body, and a size and/or shape of the modified refractive index area or areas in proximity to the bend section differs from that of the other modified refractive index areas.

13. The photonic crystal having a heterostructure according to claim 8, which is characterized in that each forbidden band zone consists of a two-dimensional photonic crystal having a slab-shaped body provided with a cyclic arrangement of areas whose refractive index differs from that of the body, and a size and/or shape of the modified refractive index area or areas in proximity to the connection point of the trunk waveguide and the branch waveguide differs from that of the other modified refractive index areas.

14. An optical multiplexer/demultiplexer, which is characterized in that it comprises a photonic crystal according to claim 1 and functions as an optical demultiplexer which uses the trunk waveguide as an input waveguide and the branch waveguide as an output waveguide, and also as an optical multiplexer which uses the branch waveguide as an input waveguide and the trunk waveguide as an output waveguide.

15. An optical transmitter/receiver, which is characterize in that it comprises a photonic crystal according to claim 1, an optical transmitter located in either the trunk waveguide in the second forbidden band zone or the branch waveguide, and an optical receiver provided in the other of the aforementioned two waveguides.

* * * * *